United States Patent [19]

Gray

[11] 4,111,235

[45] Sep. 5, 1978

[54] PIPE CAP

[75] Inventor: Charles Alexander Gray, Cypress, Calif.

[73] Assignee: BJ-HUGHES Inc., Long Beach, Calif.

[21] Appl. No.: 702,557

[22] Filed: Jul. 6, 1976

[51] Int. Cl.² ............................................. F16L 21/02
[52] U.S. Cl. ................................. 138/109; 138/111; 138/114; 138/96 R; 285/137 R; 138/89
[58] Field of Search ..................... 285/137 R, DIG. 2; 138/96 R, 89, 108, 111, 112, 114, 109; 248/56; 308/4 A

[56] References Cited

U.S. PATENT DOCUMENTS

| | | | |
|---|---|---|---|
| 1,494,234 | 5/1924 | Gossett | 248/56 X |
| 1,851,940 | 3/1932 | Williams | 248/56 X |
| 2,197,531 | 4/1940 | Smith | 138/96 R |
| 2,251,428 | 8/1941 | Smith | 138/96 R |
| 2,695,254 | 11/1954 | Isenberg | 138/109 |
| 3,162,412 | 12/1964 | McEntire | 285/137 R X |
| 3,583,710 | 6/1971 | Burelle | 285/137 X |
| 3,654,965 | 4/1972 | Gramain | 285/137 X |

FOREIGN PATENT DOCUMENTS

| | | | |
|---|---|---|---|
| 654,925 | 1/1963 | Canada | 138/96 R |
| 1,120,707 | 7/1956 | France | 248/56 |
| 254,049 | 4/1948 | France | 248/56 |
| 662,591 | 6/1938 | Fed. Rep. of Germany | 138/96 R |
| 521,303 | 5/1940 | United Kingdom | 138/96 R |

Primary Examiner—Richard E. Aegerter
Assistant Examiner—James E. Bryant, III
Attorney, Agent, or Firm—J. B. McGuire

[57] ABSTRACT

A cap for installation over the open end of a tubular member that has a pipe or pipes of smaller diameter projecting through the open end of the tubular member. The cap has a rubber discoid portion that covers the open end of the tubular member and a rubber apron extending from the discoid portion and adapted to encircle the tubular member adjacent to its open end. An aperture or apertures for the pipes of smaller diameter are provided in the discoid portion. The cap is split except at the back where a portion including the apron provides a hinge. The split intersects the aperture or apertures. A split, flexible metal band is embedded in the apron and has a latch for tightening and locking the apron about the tubular member. To install the cap, it is hinged open and placed over the end of the tubular member with the smaller diameter pipes passing through the apertures, and is then closed around the tubular member and locked.

10 Claims, 9 Drawing Figures

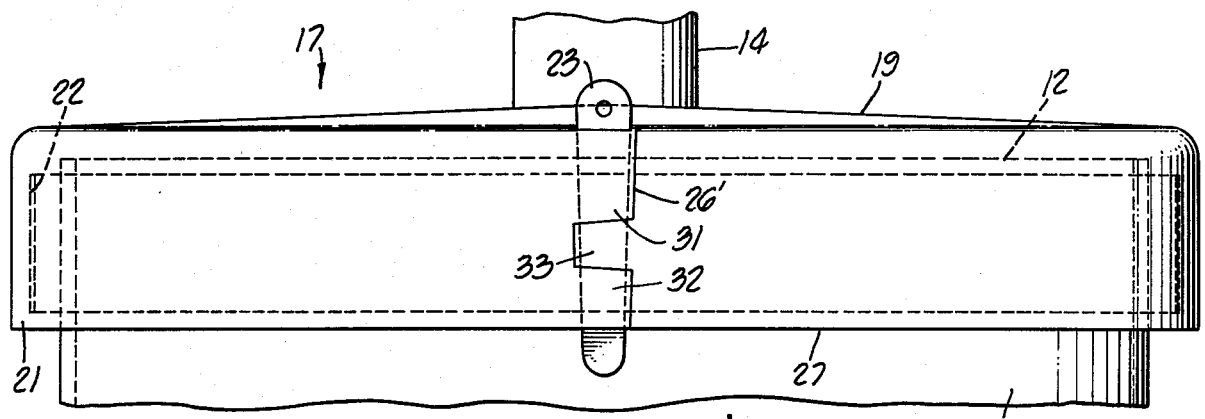
FIG. 3.
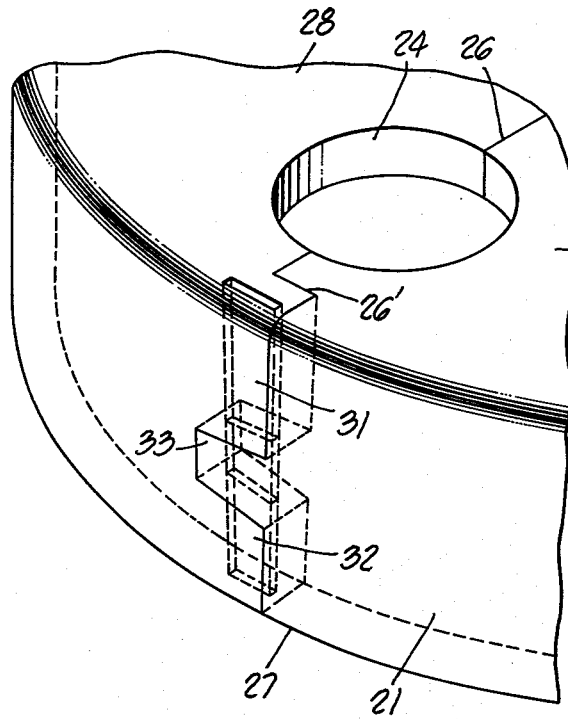
FIG. 6.
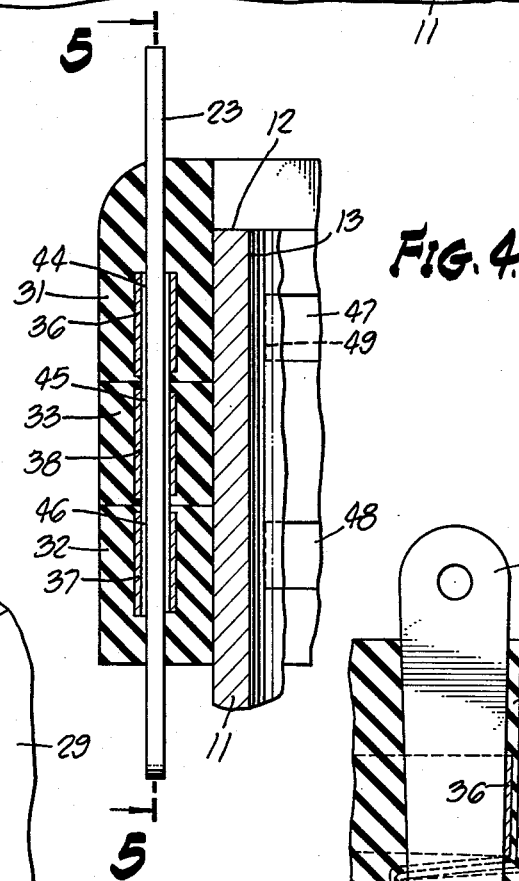
FIG. 4.
FIG. 5.

PIPE CAP

BACKGROUND OF THE INVENTION

1. Field of the Invention

This invention relates to an elastomeric cap for closing the open end of a tubular member having at least one pipe of smaller diameter projecting through its open end. More particularly, the invention is concerned with such a cap for closing the open top of a vertical support member of a pipe support structure for a petroleum pipeline.

2. Description of the Prior Art

The Trans-Alaska Pipeline is being built and will extend from a location near Beechey Point on the North Slope of Alaska to Valdez near the south coast. It will pass through terrain where the ground is frozen the year-round, this ground being commonly referred to as the permafrost. The pipe itself is supported about 8 to 15 feet above the ground on support structures that are longitudinally spaced about 60 feet apart. Each support structure has two vertical support members that are transversely spaced with a horizontal beam extending between them. The pipe is carried by a saddle mounted on the horizontal beam.

Each vertical support member is a length of tubular steel casing having an outside diameter of eighteen inches, an inside diameter of 17 inches, and a length of up to 60 feet. The vertical support member is set into a cylindrical hole drilled in the permafrost with from about 10 to 20 feet of the casing extending above grade. The annulus between the casing and walls of the hole is filled with a grouting mixture of sand and water, which freezes and supports the casing in upright position.

It is important that the grouting mixture remains frozen. To assure that it does, a pair of heat pipes, each about 3 inches in diameter are inserted vertically into the casing. These heat pipes extend from near the bottom of the casing out through its top, and terminate a few feet above the top. The interior of the casing is packed with a moist sand to grade level, the moist sand surrounding the heat pipes. This moist sand then freezes to hold the heat pipes in place. These pipes contain refrigerant, and conduct heat from the frozen sand material inside the casing to the atmosphere above the top of the casing, where the heat is radiated or given off to the atmosphere. In this way, the frozen sand inside the casing and the frozen grout that surrounds the casing are prevented from thawing.

It is essential that the weather, particularly rain and snow, be excluded from the interior of the casing. Rain is especially detrimental, as it would tend to melt the sand inside and outside of the casing. It would also saturate the sand within the casing, and could later freeze and burst the casing.

Heretofore, steel caps have been used to close the top of the casing. However, these must be cut and fitted about the heat pipes and welded to the casing. Also, the joints between the metal parts must be filled with caulking compound. These operations are time-consuming and costly, and are often difficult or impossible to perform in the inclement arctic weather.

SUMMARY OF THE INVENTION

An object of the invention is to provide a cap particularly adapted for closing the open top of a vertical casing from which one or more heat pipes project, the cap being prefabricated and easily and quickly installed with a minimum of labor, even under adverse weather conditions. No cutting or welding procedures are required to be performed in the field.

Another object is to provide a cap that can be installed and removed laterally around the heat pipes rather than over the ends thereof.

Another object is to provide such a cap that will effectively keep the weather from intruding into the casing.

These and other aims, objects and advantages of the invention as may be set forth in or be apparent from the following description are achieved in the combination with the open end of a cylindrical tubular member that has a pipe of smaller diameter projecting through its open end of a sealing cap installed over the open end of the cylindrical tubular member and surrounding the pipe for sealing the pipe to the member. The cap includes an elastomeric discoid portion covering the open end of the tubular member and having wall means defining an aperture closely encircling the pipe of smaller diameter, and a cylindrical, elastomeric apron extending from the discoid portion and closely encircling the tubular member adjacent to its open end. The apron and the discoid portion have mutually abutting walls defining a split extending from the free edge of the apron, through the apron and through a part of the discoid portion to intersect the wall means defining the aperture. A flexible, cylindrical band is embedded in the apron and defines a split substantially aligned with the section of the split that extends through the apron. There are provided securing means at one side of the aperature, operative between the ends of the band adjacent to its split, and drawing the ends of the band relatively together thereby compressing the apron into tight engagement with the tubular member, and pressing the walls of the split together and the wall means defining the aperture into tight engagement with the pipe of smaller diameter.

BRIEF DESCRIPTION OF THE DRAWINGS

FIG. 3 is a front elevational view of the cap shown in FIGS. 1 and 2, installed as aforesaid;

FIG. 4 is an enlarged, fragmentary, radial sectional view taken through the latch portion of the cap of FIGS. 1 to 3;

FIG. 5 is a sectional view taken along the line 5—5 of FIG. 4 and looking in the direction of the arrows;

FIG. 6 is a fragmentary perspective view of the front of the cap shown in FIGS. 1 to 5;

DESCRIPTION OF THE PREFERRED EMBODIMENTS

Figure 1:
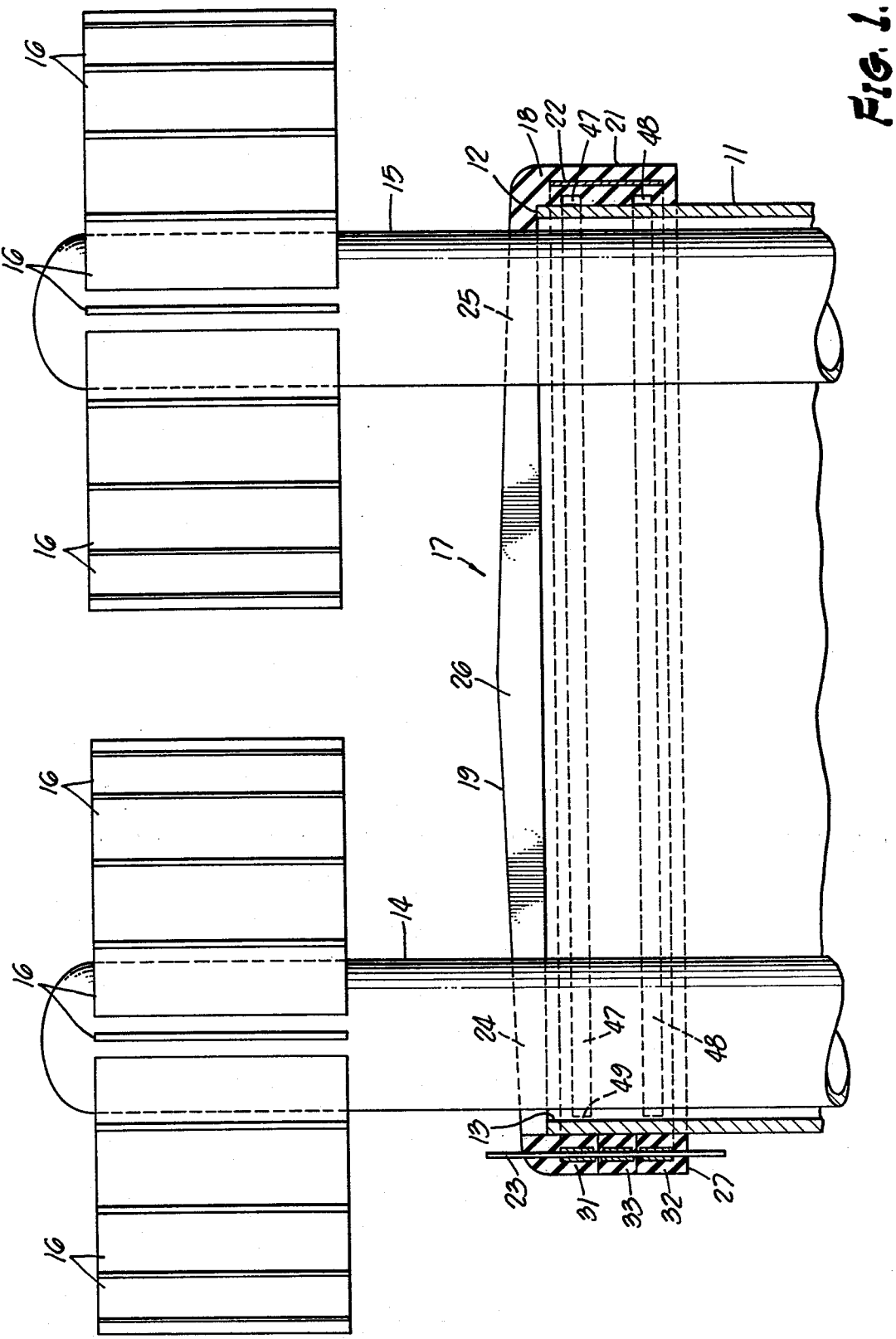
FIG. 1 is an axial sectional view of a cap in accordance with the invention, fitted onto a vertical tubular support member, and taken along the line 1—1 of FIG. 2.
Figure 2:
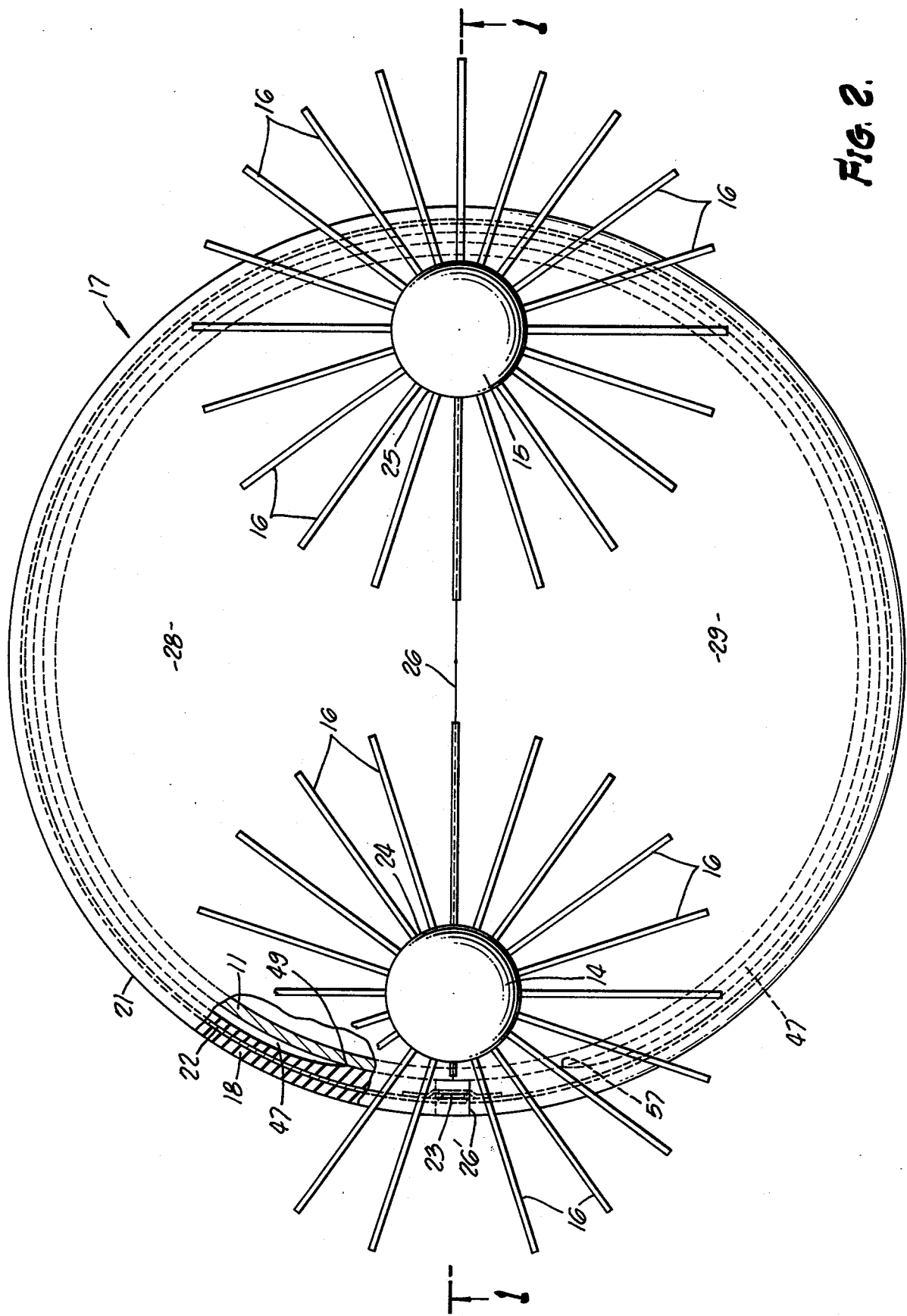
FIG. 2 is a plan view of the cap shown in FIG. 1 as fitted onto the support member, a portion being broken away to show interior construction.

Referring to the drawings, particularly to FIGS. 1 to 3, there is shown a vertical tubular member 11, which may be a vertical support member for a petroleum pipeline. This member is provided by a length of steel pipe, the lower end of which (not shown) is embedded in the permafrost. The member has an upper end 12 providing a circular opening 13. A pair of heat pipes 14,15 are inserted in the bore of the tubular member and extend vertically downwardly therein, terminating adjacent to the bottom of the tubular member. The heat pipes are of much smaller diameter than the vertical tubular member 11, and are centered along a diametral plane of the tubular member adjacent to opposite internal side portions thereof. Each heat pipe projects above the upper end 12 of the member 11 and is provided at the top with a plurality of circumferentially arranged, radially extending vanes 16 that function as heat radiators. The heat pipes 14,15 and the vanes 16 are of metal having good heat conductivity, so that heat from the interior of the vertical member is efficiently radiated to the atmosphere by the vanes 16 and the upper portions of the heat pipes that are exposed to the atmosphere.

A cap in accordance with the invention, designated by the general reference numeral 17, is installed over the upper end of the vertical member and about the heat pipes. The cap has an elastomeric portion 18 of molded and cured rubber composition, or the like. The elastomeric portion has a circular, discoid section 19 that overlies the open end of the vertical member 11, and a dependent apron 21 that is integral with the discoid section and that encircles the outer periphery of the tubular member 21 adjacent to its upper end. A circular band 22 of spring steel or other springy material is embedded in the apron. A tapered key 23 latches or locks the cap onto the tubular member 11, as will be explained more fully hereinafter.

The discoid section 19 provides holes or apertures 24,25 through which the respective heat pipes 14 and 15 extend, with the walls of the apertures closely fitted about the exterior of the heat pipes.

A diametral split 26 extends through the discoid section of the cap from the inner side of the aperture 25 to the inner side of the aperture 24, and continues, as a jagged split 26', from the outer side of the aperture 24 generally vertically downwardly through the apron 21, and terminates at the bottom edge 27 of the apron. The split 26,26' and the apertures 24,25 divide the cap into two lateral halves 28 and 29 that are joined together at the back of the cap by a web of elastomeric material and by a part of the metal band 22 that lie on a projection of the split 26 extending from the outer side of the aperture 25 to the bottom edge 27 of the apron. The area over which the lateral halves are joined together appears as the crosshatched area of the cap at the right-hand side of FIG. 1, and may be referred to herein as the hinge or hinge portion of the cap.

As best seen in FIGS. 3 and 6, the lateral half 28 of the cap has an upper, circumferential finger 31 formed principally as a part of the apron 21, and a lower finger 32 vertically spaced below the upper finger and formed as a part of the apron. These fingers provide a recess therebetween which receives an opposed finger 33 projecting into the recess from the other lateral half 29 of the cap, the opposed finger 33 being formed as a part of the apron 21.

Figure 7:
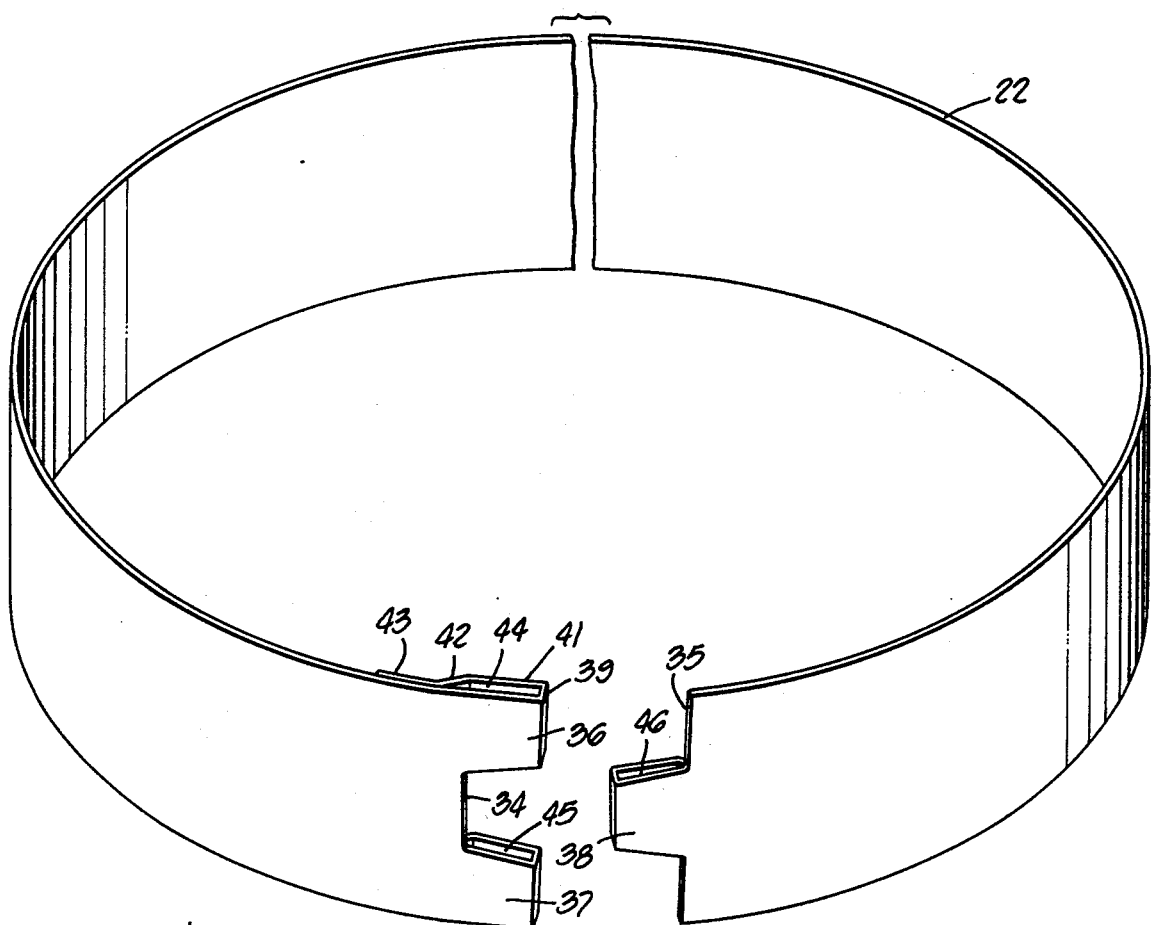
FIG. 7, is a perspective view of the flexible metal band forming a component of the foregoing cap.
Figure 9:
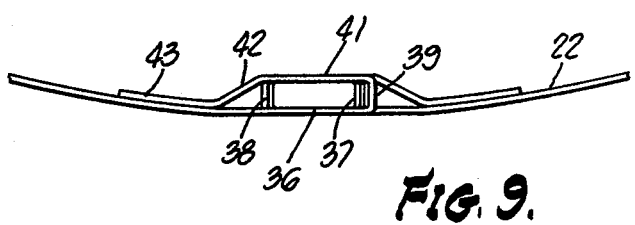
FIG. 9 is a plan view of the portion of the band shown in FIG. 8.

Referring to FIGS. 7 and 9, the band or insert 22 shown therein is vertically split at the front to provide opposed ends 34 and 35. The end 34 has vertically spaced upper and lower channel members 36 and 37. The end 35 has an opposed channel member 38 adapted to be received in the space between the upper and lower channel members 36 and 37, as clearly seen in FIGS. 8 and 9.

The channel member 36, for example, is formed by bending an extension of the band 22 radially inwardly to form a web 39, then bending the extension back upon itself to form a web 41 parallel to and spaced inwardly from the band 22, then bending the extension diagonally outwardly to form a web 42 that meets the band 22, then disposing the terminal web 43 of the extension adjacent to the inner surface of the band, and attaching the terminal web 43 to the inner surface of the band, as by spot welding. Thus, there is provided a vertical channel 44 extending through the upper channel member 36. The channel members 37 and 38 are formed in a similar manner and provide the respective vertical channels 45 and 46 as will be understood from a consideration of FIGS. 7 to 9.

Figure 8:
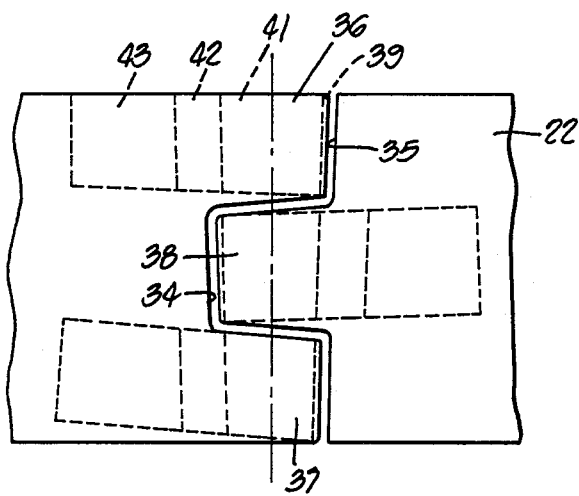
FIG. 8 is a front elevational view of the front portion of the band with its ends positioned to be latched.

When the channel members are interdigitated, as best seen in FIG. 8, the channels 44,45 and 46 are vertically aligned to provide a downwardly tapered keyway 44,45,46 for the reception of the correspondingly tapered locking key 23, previously referred to.

As best shown in FIGS. 4 and 5, the upper channel member 36 of the band 22 is embedded in the upper finger 31, the lower channel member 37 is embedded in the lower finger 32, and the opposed channel member 38 is embedded in the opposed finger 33 when the annular band 22 is emplaced within the apron 21 of the cap. The keyway is continued through the rubber portions of the fingers 32, 33, 31 to accommodate the key 23.

Referring to FIGS. 1, 2 and 4, it is seen that a pair of vertically spaced parallel, horizontal grooves 47 and 48 are recessed about the inner periphery of the apron 21. The upper groove 47 is continuous in a clockwise direction about the inner surface of the apron from a point 49 to a point 57, these points being located about 15° on either side of the diametral split 26. The groove does not reach the band 22 so as to maintain continuity of the rubber over the band. The lower groove 48 is similar to the upper groove 47.

The cap is readily removed from the tubular member 11 and the heat pipes 14 and 15 by simply withdrawing the latch key 23 from its keyway, spreading the two halves 28 and 29 apart, and withdrawing the cap to the rear of the tubular member. Owing to the presence of the radiator fins 16, the cap cannot be removed by raising it vertically over the tops of the heat pipes.

To install the cap on the vertical member and around the heat pipes, the removal steps are simply reversed. With the two halves of cap distended, the cap is moved forwardly over the vertical member 11 and the heat pipes and manually closed around them. The key 23 is inserted in the keyway and forced home. This will draw the apron into tight and weatherproof engagement with the upper end of the vertical member 11. The thickness of the rubber between the band 22 and the inner periphery of the apron will thereby be decreased from its thickness in the unstressed condition, the grooves 47 and 48 allowing some vertical displacement of the rubber to aid its radial contraction. This radial contraction imposes radially inward forces on the periphery of the discoid section 19, which cause the two halves 28 and 29 to be pressed into close mutual contact along the split 26 and into tight engagement with the heat pipes 14 and 15 in the apertures 24 and 25, thereby to provide effective sealing between these components for excluding the weather from the interior of the vertical member 11.

From the foregoing description, the manner of making and using the caps of the present invention will be clear to one skilled in the art, to whom various modifications of the exemplary from of the invention herein shown and described will be apparent, without departing from the spirit of the invention as defined in the claims.

I claim:

1. The combination with the open end of a cylindrical tubular member that has a pipe of smaller diameter projecting through its open and of a sealing cap installed over the open end of said cylindrical tubular member and surrounding said pipe for sealing said pipe to said member, said cap comprising:
   an elastomeric discoid portion covering the open end of said tubular member and having wall means defining an aperture and closely encircling said pipe of smaller diameter;
   a cylindrical, elastomeric apron extending from said discoid portion and closely encircling said tubular member adjacent to its open end;
   said apron and said discoid portion having mutually abutting walls defining a split extending from the free edge of said apron, through said apron and through a part of said discoid portion to intersect said wall means defining said aperture;
   a flexible, cylindrical band embedded in said apron and defining a split substantially aligned with the section of said split that extends through said apron; and
   securing means disposed at one side of said aperture, operative between the ends of said band adjacent to its said split, and drawing the ends of said band relatively together thereby compressing said apron into tight engagement with said tubular member, and pressing said walls of said split together and said wall means defining said aperture into tight engagement with said pipe of smaller diameter.

2. The combination defined in claim 1 wherein said apron is integral with said discoid portion.

3. The combination defined in claim 1, wherein said securing means comprise interdigitated channel members at said ends of said band, said channel members being in alignment and receiving a tapered pin for drawing said ends of said band relatively together.

4. The combination defined in claim 3, wherein said band and said securing means are of metal.

5. The combination defined in claim 1, including annular groove means on the inner periphery of said apron.

6. The combination with the open end of a cylindrical tubular member that has two pipes of smaller diameter projecting through its open end substantially along a diameter of said tubular member of a sealing cap installed over the open end of said cylindrical tubular member and surrounding said pipes for sealing said pipes to said member, said cap comprising:
   an elastomeric discoid portion covering the open end of said tubular member and having wall means defining a pair of apertures and closely encircling said respective pipes of smaller diameter;
   a cylindrical, elastomeric apron extending from said discoid portion and closely encircling said tubular member adjacent to its open end;
   said apron and said discoid portion having mutually abutting walls defining a diametral split extending from the free edge of said apron through said apron and through parts of said discoid portion to intersect said wall means defining said pair of apertures;
   a flexible, cylindrical band embedded in said apron and defining a split substantially aligned with the section of said split that extends through said apron; and
   securing means at one side of said aperture, operative between the ends of said band adjacent to its said split, and drawing the ends of said band relatively together thereby compressing said apron into tight engagement with said tubular member, and pressing said walls of said split together and said wall means defining said pair of apertures into tight engagement with said respective pipes of smaller diameter.

7. The combination defined in claim 6, wherein said apron is integral with said discoid portion.

8. The combination defined in claim 6, wherein said securing means comprise interdigitated channel members at said ends of said band, said channel members being in alignment and receiving a tapered pin for drawing said ends of said band relatively together.

9. The combination defined in claim 8, wherein said band and said channel members are of metal.

10. The combination defined in claim 6, including annular groove means on the inner periphery of said apron.

* * * * *